Sept. 20, 1938.   P. B. STREANDER   2,131,002
FILTER BED CLEANER
Filed July 16, 1937
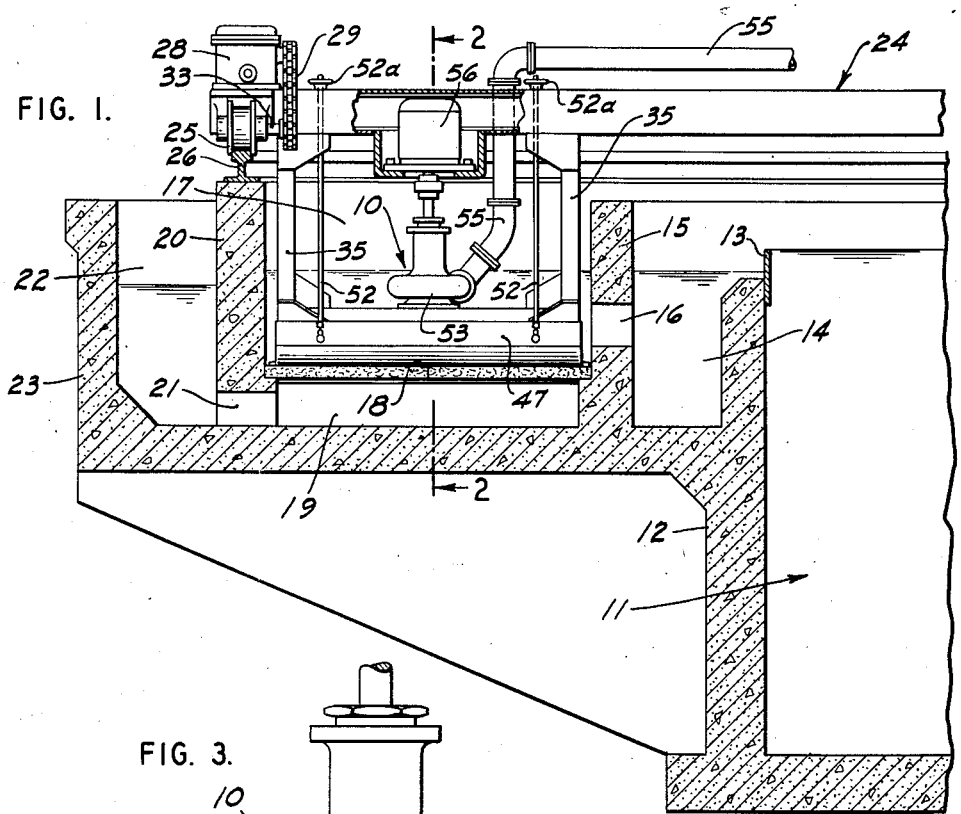
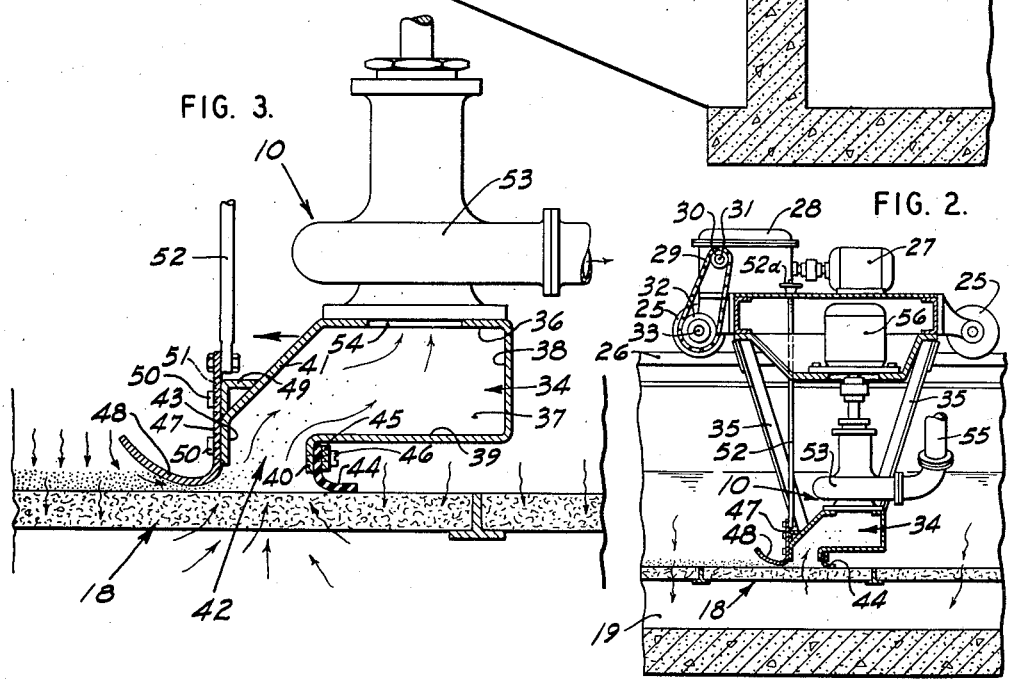
INVENTOR
PHILIP B. STREANDER
BY *Louis L. Ansart*
his ATTORNEY Patented Sept. 20, 1938

2,131,002

UNITED STATES PATENT OFFICE 2,131,002

FILTER BED CLEANER

Philip B. Streander, Maplewood, N. J., assignor to Underpinning & Foundation Co., Inc., New York, N. Y., a corporation of New York Application July 16, 1937, Serial No. 153,935

7 Claims. (Cl. 210—114)

This invention relates to filter bed cleaning in filtration of liquids and more particularly to filter-bed-cleaning means adapted to travel along the receiving face of a filter bed and clean the accumulated solids from said receiving face by drawing filtrate back through the filter bed.

The main object of the invention is to provide for novel and advantageous filter bed cleaning.

Another object of the invention is to provide novel and advantageous cleaning means acting at the receiving face of the filter bed to withdraw accumulated solids from different parts thereof at different times by drawing filtrate back through the filter bed.

In carrying out the invention, the filter bed should have a hard surface at its receiving face so that the cleaner can cooperate therewith and draw filtrate back through the filter bed. For such purposes the filter bed might be composed of granular material such as sand with a perforated plate at its receiving face. Preferably, however, the filter bed is composed of porous-plate material such for example as a porous tile plate or plates. The cleaner may be adapted to act on only a portion of the filter bed at one time and the cleaner may be caused to act on any part of the filter bed by relative movement between the filter bed and the cleaner or cleaning device.

Other objects, features and advantages will appear upon consideration of the following description and of the drawing in which:

Fig. 1 is a sectional elevation illustrating a preferred embodiment of the invention applied to the filter of a combined settling and filtration unit;

Fig. 2 is a section taken along the line 2—2 of Fig. 1; and

Fig. 3 is a fragmentary view showing a portion of Fig. 2 on a larger scale.

Referring to Fig. 1 of the drawing, a cleaner 10 embodying the present invention is illustrated in connection with a combined settling and filtration apparatus comprising a circular tank 11 having a peripheral wall 12 provided at its top with a weir 13 over which the supernatant liquid flows into a launder or overflow channel 14.

At the outer side of the launder 14 is a wall 15 higher than the weir 13 and provided with one or more openings 16 through which the liquid passes into an annular filter channel or flume 17 above an annular filter bed 18 which divides the channel 17 into an upper portion receiving the liquid to be filtered and a lower portion or filtrate chamber 19 receiving the filtrate as it passes from the filter bed.

At the outer side of the filter channel is a wall 20 which is provided with one or more openings 21 to permit filtrate to flow from the filtrate chamber 19 into an effluent channel 22 included between the wall 20 and an outer wall 23. The liquid level in the effluent channel 22 may be determined by an outlet or other discharge means not shown.

In order for the cleaner 10 to clean the filter bed 18, it must travel around the annular filter channel 17. This movement of the cleaner 10 may be effected by suspending it from an arm 24 pivotally mounted at the center of the tank 11 in a manner not shown and supported at its outer end by wheels 25 carried thereby and resting on a rail 26 mounted on the top of the wall 20. The arm 24 may be turned about its pivot at the center of the tank 11 by driving one of the wheels 25 by means including a motor 27 connected with the input shaft of a speed reducer 28 and a sprocket chain 29 connecting a sprocket 30 on an output shaft 31 of the speed reducer and a sprocket 32 on a shaft 33 carrying the driving wheel 25 and connected thereto for driving purposes.

The description thus far relates more to a form of apparatus to which is applied a preferred embodiment of the invention comprising a filter bed 18 of suitable porous tile and a cleaner or cleaning device 10 adapted to clean the receiving face of the filter bed.

The cleaner 10 may comprise a box or chamber 34 extending substantially across the annular filter channel above the filter bed and suspended from the arm 24 by members 35 connected at their lower end to the chamber 34 and at their upper ends to the arm 24. As illustrated the chamber 34 has a top 36, end walls 37, a rear wall 38, a bottom 39 having at its forward edge a flange 40 extending downwardly toward the filter bed 18, and a front wall 41 extending downwardly and forwardly to provide an opening 42 between the forward or leading edge of the bottom 39 and the lower part of the inclined front wall 41 which may be formed with a downwardly extending portion or flange 43.

In order to draw filtrate back through the filter bed 18 to clean its receiving surface, there must be a sealing connection between the edges of the opening 42 and the filter bed 18. To this end, one or more flexible strips 44, of suitable material such as rubber, may be attached to the rear and side walls of the chamber or box 38 by suitable means, such as a clamping strip 45 secured in position by screws 46. As the chamber or box 38 advances, the collected solids not only pass under the forward edge of the box but serve to keep a constant seal at this point.

Such sealing at the forward or leading edge of the opening may be obtained by means of a vertically slidable member or plate 47 having a vertical portion in close proximity to the forward face of the flange 43 and a portion 48 curved forwardly from the lower part of the vertical portion and then upwardly so that as the cleaner advances the accumulated solids will be pressed down and guided beneath the lower edge of the flange while preserving a seal at this location.

In order to provide for suitable support and guidance of the slidable member or plate 47, there may be secured to the front wall 41 of the box 34, one or more members 49 providing for upward extension of the forward face of the flange 41. Preferably these members 49 are in the form of angles which may be integral with the front wall 41 or attached thereto in any suitable manner. The plate 47 may be guided in its upward and downward movement by screws 50 of which the shanks pass through slots 51 in the plate or member 47. The screws 50 may also be used for clamping plate 47 in adjusted position. Upward and downward adjustment of the plate 47 may be effected through links or members 52 connected at their lower ends to the member 47 and provided at their upper ends with screw-threaded heads 52a which may be supported by the arm 24.

The required vacuum or suction for withdrawing the accumulated solids through the chamber or box 34 may be produced by a rotary pump 53 connected with the interior of the chamber through an opening 54 in its top and discharging the dirty water comprising filtrate and suspended solids therein through a pipe 55. The dirty water may be returned to the tank 11. The rotary pump 53 may be driven in any suitable manner, for example by means of a motor 56 carried by the arm 24 and having a shaft which may be connected with the shaft of the pump by suitable means which may include a flexible connection.

The apparatus illustrated is particularly adapted for use in connection with the treatment of sewage. In operation sewage may be supplied to the tank 11 in any suitable manner, preferably at the center of the tank. The heavier solids settle to the bottom and the sludge composed thereof may be withdrawn in any suitable manner. The supernatant liquid freed to a substantial extent of suspended solids flows over the weir 13 into the launder or channel 14 and then through one or more openings 16 in the wall 15 into the filter channel or flume 17 above the filter bed 18, then under a slight head the liquid flows downwardly through the filter bed and additional solids are removed. The filtrate from the lower or filtrate chamber passes through one or more ducts 21 into the effluent channel 22 provided with one or more outlets not shown which determine the head and control the passage of filtrate through the filter bed.

However, the filter bed would soon become clogged unless cleaned in some way, for example by means of the cleaner of the present invention. As the cleaning device advances in the direction indicated by the large arrow on Fig. 3, the raised forward edge of the curved portion or lip 48, carried by the vertically slidable or adjustable member 47, will ride over the accumulation of solids on the filter so as to compact them and maintain a tight seal while at the same time introducing them into the opening 42 through which they may pass upwardly and rearwardly into the chamber 34 together with filtered liquid drawn back through the filter bed 18 with solids passing into the pores of the filter bed during the filtering action.

It will be seen that the arrangement of the opening 42 in advance of the main part of the chamber 34 and the inclined front wall 41 of the chamber facilitate the flow of the solid carrying liquid or dirty water up through the main body of the chamber to the opening 54 through which it passes into the pump 53. From this pump the dirty water may be discharged through a pipe 55 and preferably returned to the tank 11.

It should be understood that various changes may be made in various features of the invention and that certain features may be used without others without departing from the true scope and spirit of the invention.

Having thus described my invention, I claim:

1. A device for cleaning the filter bed of a liquid filter of which the filter bed has a hard surface at its receiving face, said device being movable along said hard surface and comprising a chamber having an opening adjacent to said hard surface and with the leading edge of said opening spaced from said hard surface to admit the collected solids, flexible sealing means around the side edges and trailing edge of said opening and engaging said hard surface to effect a seal and suction means connected with said chamber and adapted to draw filtrate back through said bed and said opening and withdraw the solids at said opening through the chamber, said flexible sealing means comprising a flexible strip having a fluid tight connection with the side edges and trailing edge of said opening and extending outwardly over the filter surface whereby suction through said chamber draws the outwardly extending strip toward said filter surface and produces an effective seal.

2. A device for cleaning the filter bed of a liquid filter of which the filter bed has a hard surface at its receiving face, said device being movable along said hard surface and comprising a chamber having an opening adjacent to said hard surface and with the leading edge of said opening spaced from said hard surface to admit the collected solids, means for varying the spacing of said leading edge from said hard surface, flexible sealing means around the side edges and trailing edge of said opening and engaging said hard surface to effect a seal and suction means connected with said chamber and adapted to draw filtrate back through said bed and said opening and withdraw the solids at said opening through the chamber, said flexible sealing means comprising flexible strip material projecting from said side edges and trailing edge of said opening to a greater extent than the distance between said edges and said hard surface and being turned outwardly whereby suction through the chamber acts to intensify the sealing action.

3. A device for cleaning the filter bed of a liquid filter of which the filter bed has a hard surface at its receiving face, said device being movable along said hard surface and comprising a chamber having an opening adjacent to said hard surface with an adjustable slide at the leading edge of said opening movable toward and from said hard surface to provide an opening corresponding with the thickness of the layer of collected solids, flexible sealing means around the side edges and trailing edge of said opening and engaging said hard surface to effect a seal and suction means connected with said chamber and adapted to draw filtrate back through said bed and said opening and withdraw the accumulated solids at said opening through the chamber.

4. A device for cleaning the filter bed of a liquid filter of which the filter bed has a hard surface at its receiving face, said device being movable along said hard surface and comprising a chamber having an opening adjacent to said hard surface, sealing means at the side edges and the trailing edge of said opening and engaging said hard surface to effect a seal, a device at the leading edge of said opening adjustable toward and from said hard surface to provide an opening for admission to the chamber of accumulated solids on said hard surface, and suction means for drawing filtrate back through said bed and through said opening and withdrawing solids accumulated on said hard surface through said chamber.

5. A device for cleaning the filter bed of a liquid filter of which the filter bed has a hard surface at its receiving face, said device being movable along said hard surface and comprising a chamber having an opening adjacent to said hard surface, sealing means at the side edges and the trailing edge of said opening and engaging said hard surface to effect a seal, a member at the leading edge of said opening adjustable toward and from said hard surface to provide an opening for admission to the chamber of accumulated solids on said hard surface, a device at the lower edge of said member to compress the solids on said hard surface and cause them to pass beneath said member, and suction means for drawing filtrate back through said bed and through said opening and withdrawing solids accumulated on said hard surface through said chamber.

6. The combination with a filter bed of a liquid filter of which the filter bed comprises porous plate material at its receiving face, of a filter bed cleaning device being movable along said porous plate material and comprising a chamber having an opening adjacent to said plate material, sealing means at the side edges and the trailing edge of said opening and engaging said plate material to effect a seal, a device at the leading edge of said opening adjustable toward and from said plate material to provide an opening for admission to the chamber of accumulated solids on said plate material, and suction means for drawing filtrate back through said bed and through said opening and withdrawing solids accumulated on said plate material through said chamber.

7. A device for cleaning the filter bed of a liquid filter of which the filter bed has a hard surface at its receiving face, said device being movable along said hard surface and comprising a chamber having an opening in advance of the main part of the chamber, adjacent to said hard surface and with the leading edge of said opening spaced from said hard surface to admit the collected solids, said chamber having a front wall inclined upwardly and rearwardly from the front edge of said opening to the top of said chamber, flexible sealing means around the side edges and trailing edge of said opening and engaging said hard surface to effect a seal and suction means connected with said chamber and adapted to draw filtrate back through said bed and said opening and withdraw the solids at said opening through the chamber, and having at its lower and forward part an upwardly turned portion to compress the solids resting on the filter bed as it rides over the same.

PHILIP B. STREANDER.